United States Patent [19]
Valentine

[11] 3,990,158
[45] Nov. 9, 1976

[54] EDUCATIONAL DEVICE FOR LEARNING THE FUNDAMENTALS OF AUTOMOTIVE FUEL SYSTEM

[75] Inventor: Charles Glenn Valentine, Stamford, Conn.

[73] Assignee: Xerox Corporation, Stamford, Conn.

[22] Filed: Dec. 14, 1973

[21] Appl. No.: 424,982

Related U.S. Application Data

[63] Continuation-in-part of Ser. No. 345,920, March 29, 1973, abandoned.

[52] U.S. Cl. ................................... 35/13; 35/7 A; 40/142 A
[51] Int. Cl.² .................................... G09B 25/02
[58] Field of Search ............... 35/7 A, 8 R, 8 A, 9 R, 35/9 A, 9 B, 10, 11, 13, 19 R, 19 A, 48 R, 49, 54; 40/142 A; 123/136

[56] References Cited
UNITED STATES PATENTS

| | | | |
|---|---|---|---|
| 1,270,369 | 6/1918 | Bishop | 35/13 X |
| 3,077,696 | 2/1963 | Barnett et al. | 35/19 A |
| 3,245,156 | 4/1966 | DeBloois et al. | 35/8 A |
| 3,423,846 | 1/1969 | Arend | 35/19 A |
| 3,514,873 | 6/1970 | Stobbe | 35/7 A X |
| 3,538,626 | 11/1970 | Frank | 35/48 R |
| 3,654,711 | 4/1972 | Taylor | 35/7 A X |

OTHER PUBLICATIONS

Esso Research & Eng. Co.; "Evaporative Loss Control Device;" pp. 1, 2, 3, 9, 16.

Primary Examiner—Richard C. Pinkham
Assistant Examiner—Vance Y. Hum

[57] ABSTRACT

An educational kit for teaching the parts and operation of a typical automotive fuel system is disclosed. The kit comprises audiovisual instructional equipment, a simulator board upon which is graphically depicted indicia representing a schematic diagram of an automotive fuel system, and a plurality of manipulative pieces upon which are graphically depicted schematic diagrams of various parts of the automotive fuel assembly, or word indicia naming various parts of said system. The pieces are adapted to be positioned on the simulator board such that the user of the kit may graphically depict the assembly, relationship of parts, and operation of a fuel system.

8 Claims, 7 Drawing Figures

AUDIO VISUAL MEANS

WORK SHEETS

EDUCATIONAL DEVICE FOR LEARNING THE FUNDAMENTALS OF AUTOMOTIVE FUEL SYSTEM

This application is a continuation-in-part of applicant's copending application, Ser. No. 345,920, filed Mar. 29, 1973, now abandoned.

BACKGROUND OF THE INVENTION

The present invention relates to a portable, compact and easily assembled educational kit. More specifically, the present invention is directed towards an educational kit for teaching the assembly, relationship of parts and operation of an automotive fuel system comprising as the essential components thereof an audiovisual instructional means, a simulator board bearing graphic indicia thereon, and a plurality of manipulative pieces bearing graphic indicia thereon, which indicia is relatable to the indicia present on the simulator board such that the student can demonstrate his understanding of the fundamentals of the automotive fuel assembly by arranging certain of the manipulative pieces on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent years, the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few educational devices available in the community colleges, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of several fundamental automotive fuel assemblies.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia, and a plurality of manipulative pieces bearing graphic indicia depicting schematic diagrams of a fundamental automotive fuel assembly, including an air cleaner, a carburetor, an intake manifold, a fuel filter, a fuel pump, and a fuel tank, or word indicia naming various parts of said system, whereby the student may position the pieces at the appropriate indicia present on the simulator board in response to the instructional means to graphically depict construction of an automotive fuel system and physically simulate the operation thereof.

SUMMARY OF THE INVENTION

In accordance with the objects and teachings of the present invention, a simple and effective educational kit or unit for the teaching of an automotive fuel assembly is provided. The unit comprises an instruction means, a simulator board upon which is graphically depicted indicia representing schematic views of various parts of an automotive fuel assembly including an air cleaner, a carburetor, and intake manifold, a fuel filter, a fuel pump, and a fuel tank, and a plurality of pieces upon which are graphically depicted schematic of various component parts of the automotive fuel system or certain descriptive word indicia relating thereto. The kit may also comprise a display board which provides for storage and easy access to the various pieces when the kit is in use. The kit is designed to present the fundamentals of the automotive fuel system whereby the student learns the assembly, relationship of parts and operation of said system. This information is conveyed to the student using a programmed multimedia approach whereby the student hears and sees information, performs by answering questions, solving problems and manipulating objects. The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this new knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides or filmstrips in conjunction with a descriptive audio account of the visuals, presented by means of tapes or audio cassettes. A recorded narrator provides background information relating to an automotive fuel system, including the parts thereof, how the system operates, advantages and disadvantages, and the like. During this audio presentation, a series of synchronized related visuals are shown to the students. These visuals comprise photographs or diagrams of the various parts of an automotive fuel system during various phases of operation. From this illustration of an automotive fuel assembly, the principles and function of this system can be understood.

The audiovisual equipment needed will vary depending on the type of instruction to be given. A rear screen projector for small groups, or a projector and screen for a classroom presentation may be used. For the audio presentation, either visual projection equipment with built-in audio capability or a separate recorder may be used. The instructional means provided with the educational kit includes a visual segment available, for example, on 35mm slides or filmstrips, and an audio segment available on cassettes. The supporting equipment is normally not included with the kit.

At various points during the presentation, the student is requested to stop the audiovisual presentation and perform certain activities using the simulator board and pieces associated therewith. For example, he may be requested to position pieces depicting an outlet wave, a pulsator diaphragm, an inlet valve, a diaphragm, a pull rod and spring, a camshaft, a rocker arm, a top section fuel pump, and a bottom section fuel pump, and the like in their proper positions relative to the fuel pump diagram present on the simulator board, and label the various components so placed using other pieces bearing indicia naming these parts. The simulator activity thus allows the student to use his hands as a learning tool, as well as his eyes and ears. By performing an activity using the simulator board and its accessories, the learning process is reinforced and the student takes an active part in learning and achieves understanding more quickly.

The simulator board and the accessories are best described with reference to the attached drawings.

DETAILED DESCRIPTION OF THE DRAWINGS

Figure 1:
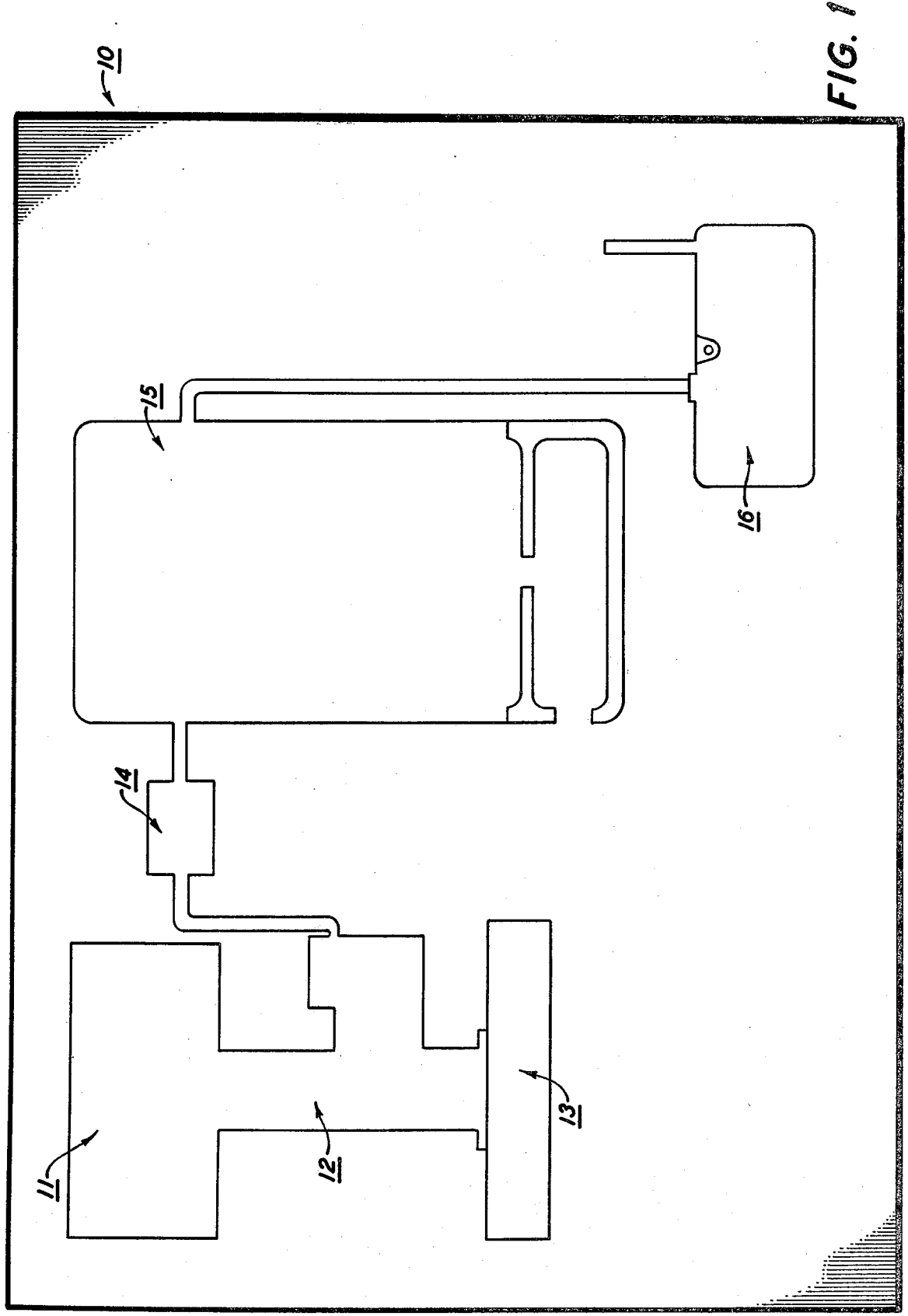
FIG. 1 is a plan view of the simulator board with graphic indicia thereon.

In FIG. 1 the simulator board 10 is shown having printed thereon graphic indicia depicting a schematic view of a total automotive fuel system including an air cleaner 11, a carburetor 12, an intake manifold 13, a fuel filter 14, a fuel pump 15, and a fuel tank 16. These diagrams serve as locations for positioning the manipulative pieces in order to simulate the assembly and operation of an automotive fuel system which will be hereinafter described.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal with suitably smooth edges, the metallic sheet may also be laminated to a suitable backing member which imparts suitable rigidity thereto. Thus, the simulator board may comprise a thin sheet comprising ferrous metal having a thickness of about 1/32 inch laminated to a backing member made from a rigid material such as fiberboard, or a resinous material, said backing material having a preferred thickness of about ¼ inch. The dimensions of the simulator board should be such that the board can be conveniently used by the student at a given work place. Boards having dimensions of about 15 × 20 inches, or approximately 300 square inches, are particularly suitable.

Figure 2:
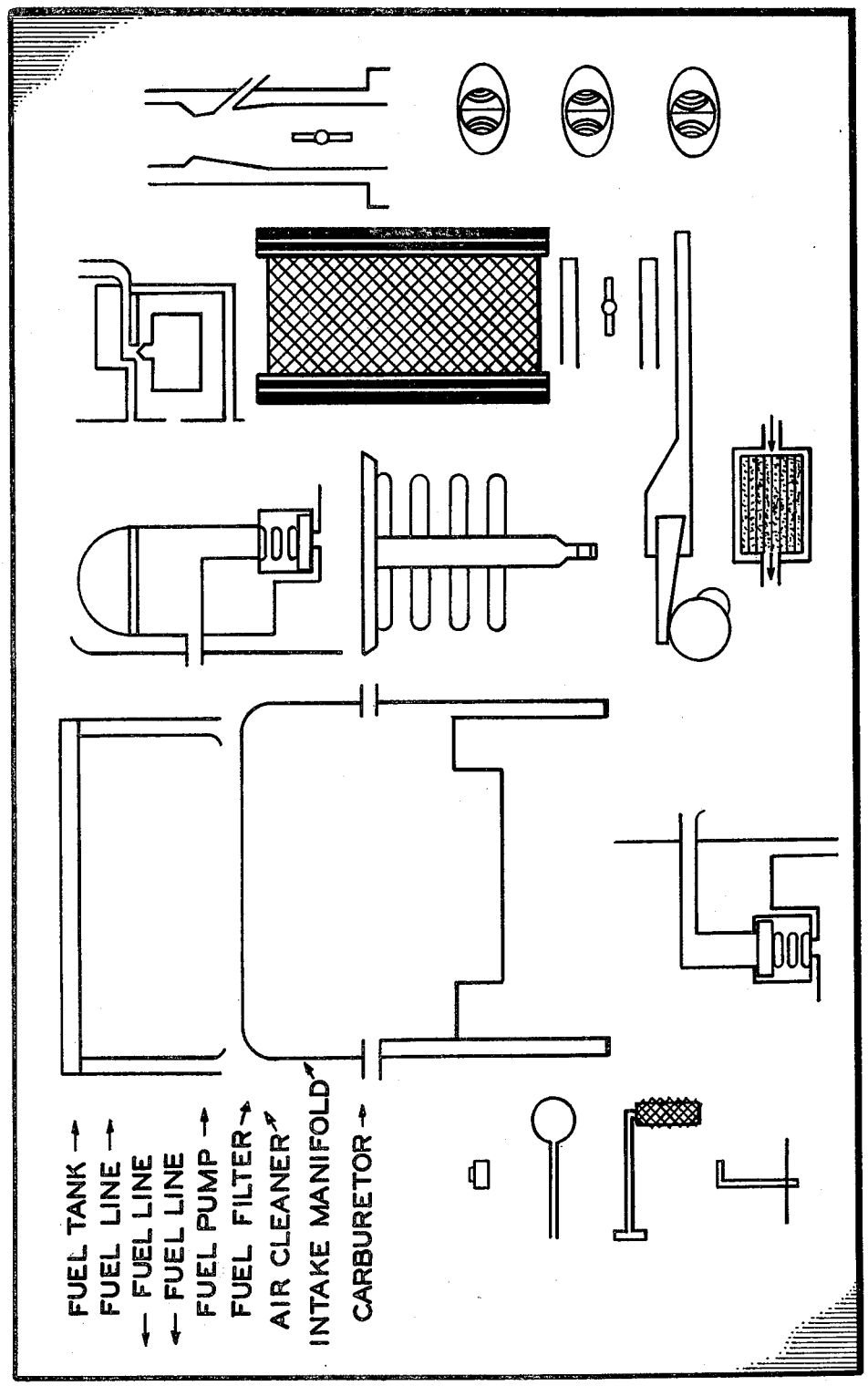
FIG. 2 is a plan view of the display board with graphic indicia thereon.

In FIG. 2 the display board is shown having printed thereon graphic indicia depicting various parts for an automotive fuel system, and certain descriptive word indicia on the left side. The display board is also constructed on a magnetically attractive material similar to the simulator board and the background indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
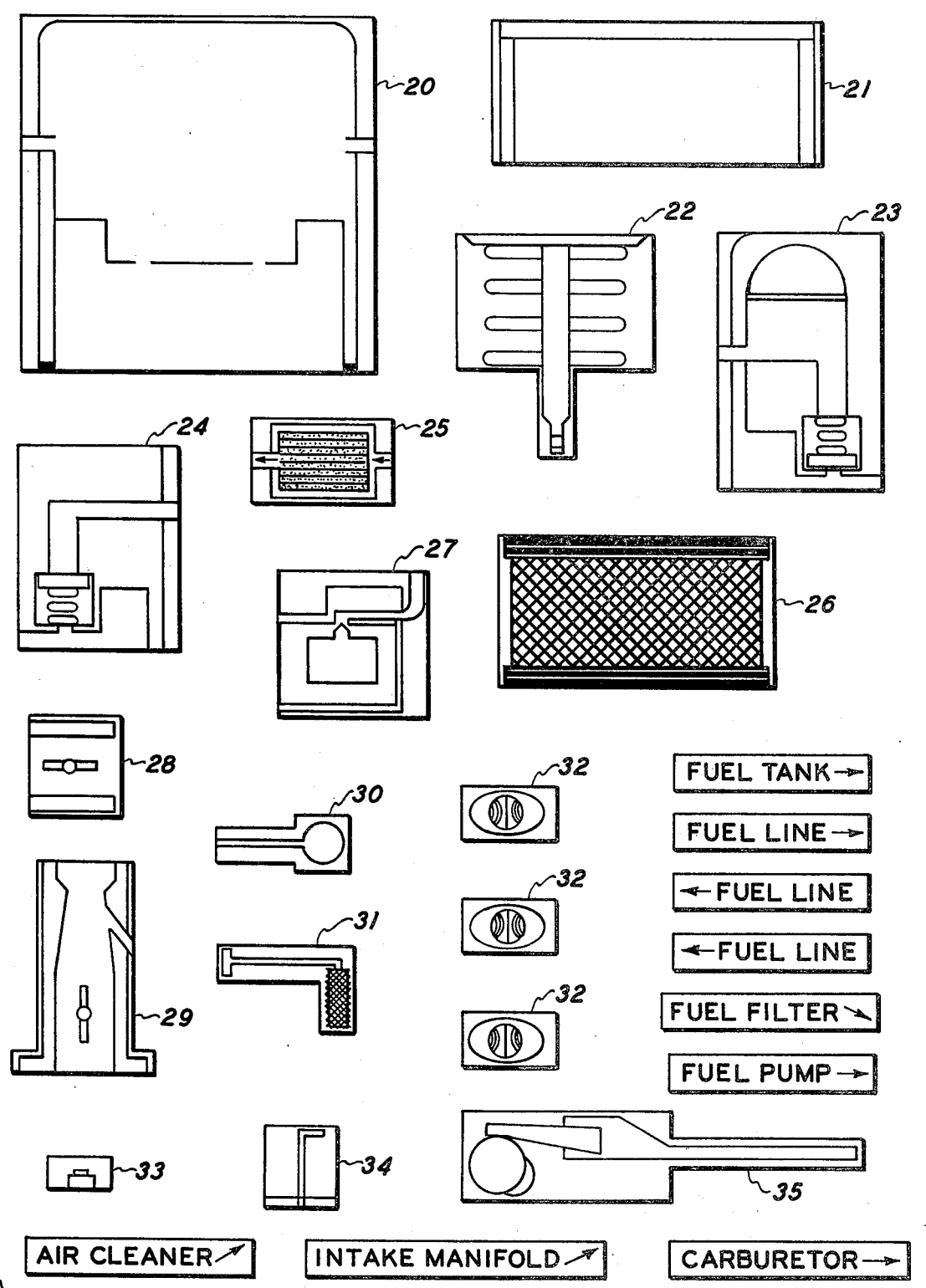
FIG. 3 is a plan view of some of the manipulative pieces having graphic indicia thereon.

The manipulative pieces used in the educational kit of this invention are shown in FIG. 3. Each of thee pieces is made of a flat sheet of a rigid material such as metal or plastic and has laminated to the underside thereof smaller pieces of a magnetically attractive material such as metal or ferrite plastic. The preferred thickness of the pieces is approximately 1/16 of an inch and the thickness of a smaller section laminated to the underside of the pieces is about 3/32 of an inch.

As shown in FIG. 3, some of the pieces bear indicia depicting schematic side view diagrams of various of the component parts of an automotive fuel system and other of the pieces bear word indicia. Piece 20 depicts a top section of a fuel pump, piece 21 a diaphragm, piece 22 a diaphragm pull rod and spring, piece 23 a fuel pump inlet valve, piece 24 a fuel pump outlet valve, piece 25 an in line fuel filter, piece 26 an air cleaner filter, piece 27 a float chamber, piece 28 an air horn, piece 29 a carburetor body, piece 30 an indicator float, piece 31 a screened fuel pickup, pieces 32 represent manifold openings, piece 33 a gas cap, piece 34 a vapor vent, and piece 35 a rocker arm and camshaft.

In FIG. 3 there is shown pieces bearing word indicia such as "FUEL PUMP" and "CARBURETOR" and each having an arrow to facilitate designation of the particular part when used in conjunction with the schematic of FIG. 1. Specifically, a piece designating an element of one of the subsystems of FIG. 1 may be placed outside of the system with the arrow approximately pointing out said element.

All of the depicted pieces in FIG. 3 are adapted for use in conjunction with the automotive fuel schematic of the simulator board such that the student may simulate the construction and operation of automotive fuel system. For example, by properly superimposing the screened fuel pickup piece 31, float piece 30, and vapor vent 34, gas cap 33 into the fuel tank portion 6 of FIG. 1, the student can visualize and understand the function of a belt tank in an automotive fuel system. A still broader understanding of the automotive fuel system construction and mechanism is afforded the student by proper placement and manipulation of the remaining pieces into the remaining portions of the schematic of FIG. 1.

Figure 4:
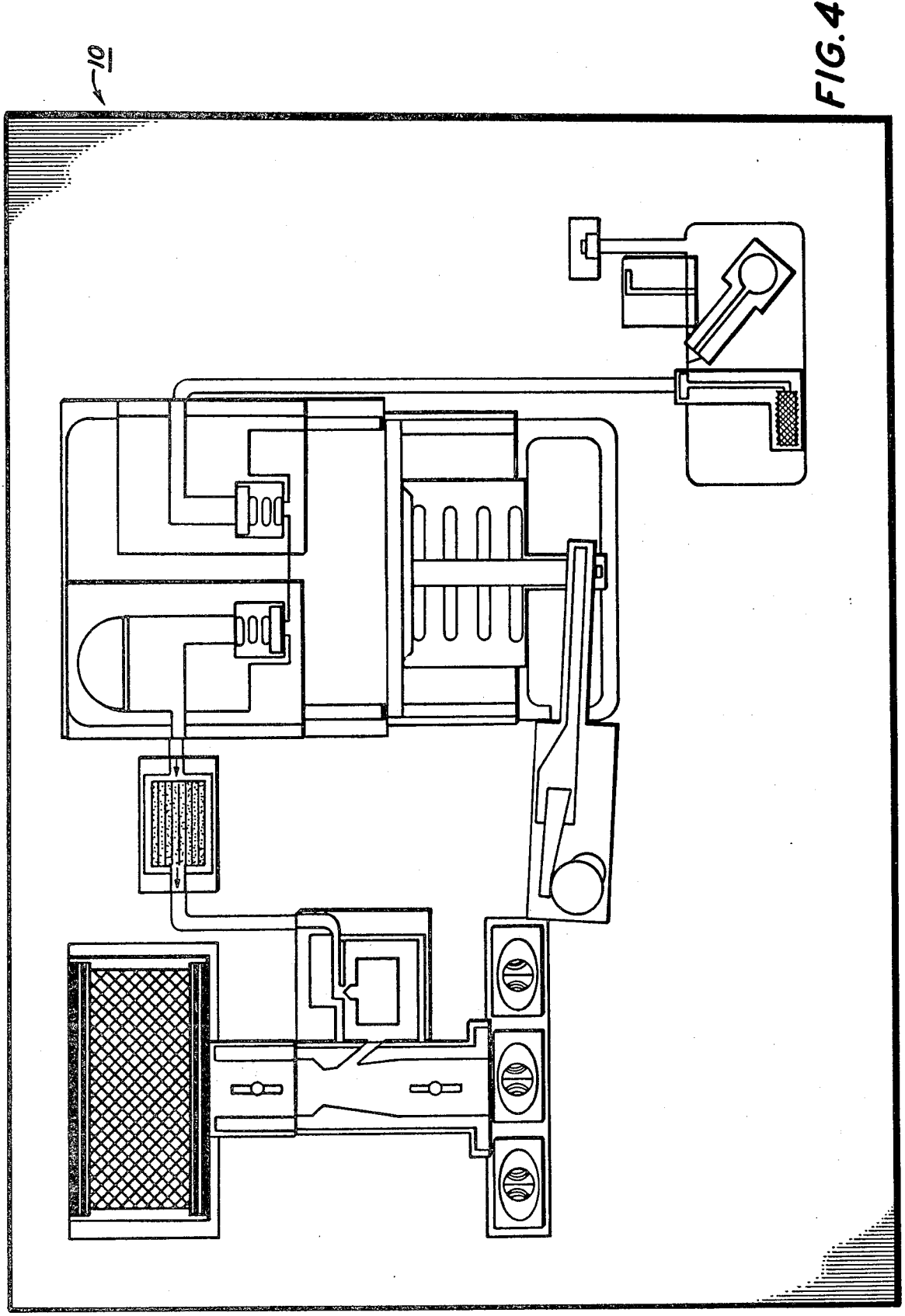
FIG. 4 is a plan view of the simulator board with certain of the manipulative pieces in place.
Figure 5:
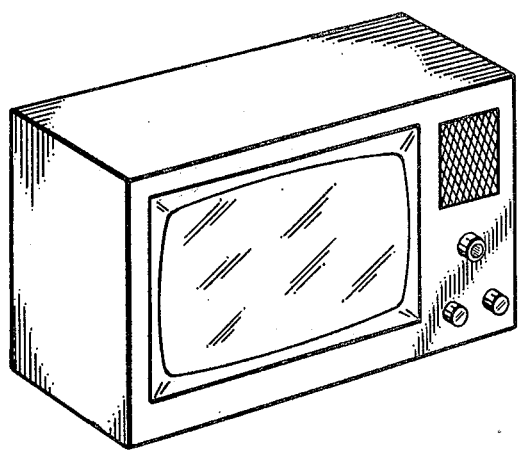
FIG. 5 illustrates generally an audiovisual device suitable for use in the present invention.
Figure 6:
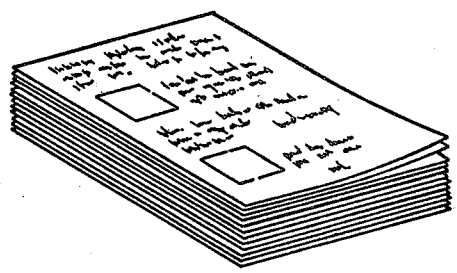
FIG. 6 illustrates generally worksheets in accordance with the present invention.
Figure 7:
FIG. 7 is a side sectional view of a typical manipulative piece in accordance with the invention showing smaller magnetic sections laminated to the underside of the piece.

In FIG. 4 the simulator board is shown with certain of the manipulative pieces in place. On the schematic of the fuel system of FIG. 1, the general assembly of an automotive fuel system has been constructed by superimposing within the general schematic all of the appropriate pieces in the air cleaner, carburetor, intake manifold, fuel filter, fuel pump, and fuel tank. As can be seen this truly enables a student to appreciate the construction of an automotive fuel system.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need only be of a material that is attracted to a magnet. In the simpler and preferred embodiment, the bases of the pieces have laminated thereto a section of a magnetic material such as magnetic plastic or metal, and the boards are made of a material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit, and an instructor's manual.

To illustrate how the educational kit of the present invention is used, the audiovisual presentation begins with a brief discussion of the general principles of an automotive fuel system including a description of an intake manifold, a carburetor, an air cleaner, a fuel filter, a fuel pump, and a fuel tank. The student's attention is then directed to FIG. 1 which is a schematic of a basic automotive fuel system. It is explained that when the car's engine is running, fuel flows from the fuel tank 16 on the right through the fuel line to the carburetor 12 on the left. It is further explained how the fuel pump 15 pushes the fuel through the fuel filter 14 toward the carburetor 12. Each of the major component parts of the automotive fuel system are in turn discussed and the student is shown what these parts look like by means of the visual diagrams and the accompanying audio presentation.

At various points throughout the audiovisual presentation the student is requested to turn to the simulator board and accessory pieces associated therewith in order to physically simulate the construction and assembly of various component parts of the automotive fuel assembly. For example, the function of a fuel tank can be depicted by positioning pieces 30, 31, 33, and 34 within the fuel tank component 16 of FIG. 1. Therefore, from this exercise the student can appreciate mechanisms of each component and appreciate the realities of the well-known automotive gas tank. For example, the student can understand how the float element 30 enables one to read the fuel gauge inside of the automobile. Note that the fuel tank with all four elements has been reconstructed in FIG. 4.

The instructional means subsequently turns to a detailed discussion concerning the physical principles surrounding an automotive fuel assembly. For example, it is explained that for the best balance between economy and power, approximately 15 parts of air are mixed with 1 part gasoline. At this point, the instructional means explains the different physical characteristics of air and gasoline. Therefore, it is explained that it takes more than 600 cubic feet of air to equal the weight of 1 cubic foot of gasoline which is 7 ½ gallons. Therefore, the student can easily visualize that the volume of air that flows through carburetor to mix with the gasoline is quite large. In addition, the principles of the fuel pump and intake manifold are explained utilizing the concepts of vacuum and the atmospheric pressure of the earth. In this manner all of the subsystems outlined in the schematic diagram of FIG. 1 are adequately explained to the student.

The instructional means then directs the student's attention to the simulator board of FIG. 1 and, in particular, the fuel pump 15 subsystem. At this point the student is shown a picture of the cross-section of a fuel pump. It is explained that there is a vacuum created in the pump and atmospheric pressure in the gas tank forces gasoline to flow into the pump. The major sections of a fuel pump are then explained and described to the student. They include the pulsator diaphragm, the outlet valve, the top section fuel pump, the inlet valve, the diaphragm, the pull rod and spring, the bottom section fuel pump, and the camshaft and rocker arm. The student is then directed to take all the respective pieces corresponding to these elements and place them in the fuel pump subsystem 15 of FIG. 1. Therefore, the student is able to reconstruct the fuel pump as shown in FIG. 4. In the same manner the student is able to reconstruct the air cleaner 11, the carburetor 12, the intake manifold 13, the fuel filter 14, and the fuel tank 16 of the simulator board represented in FIG. 1. FIG. 4 demonstrates the reconstruction of all the elements of the simulator board.

Throughout the audiovisual presentation each of the principles surrounding the subsystems set forth in the schematic diagram of FIG. 1 are explained. Therefore, by reference to physical principles to which the student is well aware, he is able to get a more complete understanding as to the necessary parts of any one subsystem. In addition, he is able to get a more complete picture of all the subsystems necessary to an automotive fuel system.

The above described educational kit thus provides the student with an opportunity of exploring concepts involved in the operation of an automotive fuel assembly by simulating the construction and arrangement of parts involved in such a system. The educational kit is programmed such that the student will encounter a minimum of frustration and a maximum learning efficiency during the use of the kit. Upon completion of the kit, the student should be able to state the function of an automotive fuel system; label the six major parts of the fuel system on the schematic drawing of FIG. 1; name the materials from which fuel lines are usually made; match the components of a fuel system with their functions; state the ratio for mixing air with gasoline by weight to achieve the best balance between power and economy; label the four components found in a fuel tank on a schematic drawing of the tank; match the names of a fuel or fuel tank components with their function; identify the major parts of a fuel pump from a side view cross-section drawing of the pump; explain how a vacuum is created in a fuel pump; state the function of a pulsator diaphragm; select the three functions of an air cleaner from a list of several choices; choose from a list of carburetor functions those operations performed by the choke plate and those performed by the throttle plate; identify the three major sections of a single barrel carburetor; and name the passageway which direct the fuel air mixture from the intake manifold to the combustion chambers.

A complete description of the educational kit encompassed by the present invention may be found in the booklet entitled "Automotive Technology - Fuel System Fundamentals" (Unit 10159–80), published as part of the Occupational Technology Series by the Xerox Corporation.

What is claimed is:

1. An educational kit for teaching the assembly, relationship of parts, and operation of an automotive fuel system comprising:
   a. a simulator board having a surface of magnetically attractive material and including graphic indicia on the surface thereof defining a schematic diagram of an automotive fuel system including an (i) air cleaner, (ii) a carburetor, (iii) an intake manifold, (iv) a fuel filter, (v) a fuel pump, and (vi) a fuel tank, the indicia on said simulator board being as shown by the non-numerical indicia of FIG. 1;
   b. a plurality of magnetically attractive manipulative pieces each bearing individually on their surfaces graphic indicia defining items found within an automotive fuel system, said pieces comprising (i) a plurality of pieces each containing indicia defining elements found within an automotive fuel assembly; and (ii) a plurality of pieces each containing word indicia defining various segments of an automotive fuel system, the pieces being adapted for manipulation within the confines of the elements of the automotive fuel system of the simulator board, the indicia on said manipulative pieces being as shown by the non-numerical indicia of FIG. 3;
   c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and
   d. audiovisual instructional means for presenting information relevant to the basic principles about automotive fuel systems including information defining (i) the elements of the automotive fuel system of the simulator board, (ii) the indicia on the manipulative pieces, (iii) the indicia on said board, (iv) the relationship of the indicia on the simulator board to the indicia on said pieces and use of same on said board whereby the assembly, relationship of parts, and operation of an automotive fuel system can be learned by the user by using said board in response to said instructional means.

2. An educational kit according to claim 1 wherein said manipulative pieces are magnetic.

3. An educational kit according to claim 1 wherein said manipulative pieces comprise a flat sheet of rigid material having smaller sections of a magnetic material laminated thereto.

4. An educational kit according to claim 1 wherein the indicia depicted on said manipulative pieces comprises subsystem components of an automotive fuel system, including a top section of a fuel pump, a diaphragm pull rod and spring, a fuel pump inlet valve, a fuel pump outlet valve, an in line fuel filter, an air cleaner filter, a float chamber, an air horn, a carburetor body, an indicator float, a screened fuel pickup, manifold openings, a gas cap, a vapor vent, and a rocker arm and camshaft.

5. An educational kit according to claim 1 wherein said audio instruction means includes tape recordings which are synchronized with said visual instruction means which includes slides or filmstrips.

6. An educational kit according to claim 1 wherein said instruction means includes a plurality of student work sheets, said work sheets being adapted for use by the student to record information and test the student in response to said audiovisual instruction means.

7. An educational kit according to claim 1 wherein said simulator board, said manipulative pieces, and said display board are constructed of a substantially rigid material.

8. An educational kit according to claim 1 further comprising a compartmentalized case, said case being adapted for storage of said kit.

* * * * *